(12) United States Patent
Gehris

(10) Patent No.: US 10,946,332 B2
(45) Date of Patent: Mar. 16, 2021

(54) OPEN CHANNEL DIFFUSIOPHORETIC WATER FILTRATION DEVICE AND METHOD

(71) Applicant: Split Rock Filter Systems LLC, New Paltz, NY (US)

(72) Inventor: William Christian Gehris, New Paltz, NY (US)

(73) Assignee: Split Rock Filter Systems LLC, New Paltz, NY (US)

( * ) Notice: Subject to any disclaimer, the term of this patent is extended or adjusted under 35 U.S.C. 154(b) by 97 days.

(21) Appl. No.: 16/122,699

(22) Filed: Sep. 5, 2018

(65) Prior Publication Data

US 2019/0151795 A1 May 23, 2019

Related U.S. Application Data

(63) Continuation-in-part of application No. 15/861,273, filed on Jan. 3, 2018, now Pat. No. 10,155,182.

(Continued)

(51) Int. Cl.
*B01D 46/54* (2006.01)
*B01D 53/22* (2006.01)
(Continued)

(52) U.S. Cl.
CPC ......... *B01D 53/228* (2013.01); *B01D 46/543* (2013.01); *B01D 53/22* (2013.01);
(Continued)

(58) Field of Classification Search
CPC .... B01D 53/22; B01D 53/228; B01D 46/543; B01D 65/02; B01D 65/08; B01D 61/14;
(Continued)

(56) References Cited

U.S. PATENT DOCUMENTS

| | | | |
|---|---|---|---|
| 6,355,134 B1 * | 3/2002 | Berndt | B01D 19/0031 156/311 |
| 9,073,012 B2 * | 7/2015 | Homon | B01D 61/20 |
| 2018/0257054 A1 | 9/2018 | Shardt et al. | |

FOREIGN PATENT DOCUMENTS

| | | |
|---|---|---|
| CA | 2909003 A1 | 4/2017 |
| WO | WO 2015/077674 A1 | 5/2015 |
| WO | WO2018048735 A1 | 3/2018 |

OTHER PUBLICATIONS

Itaca, "An introduction to slow sand filtration", Dec. 1, 2005. www.itacanet.org. (Year: 2005).*

(Continued)

*Primary Examiner* — Benjamin L Lebron

(57) ABSTRACT

A water filtration device is provided including a pressurized gas chamber receiving a pressurized gas; an open flow chamber receiving a colloidal suspension including water and colloidal particles, the open flow chamber having an inlet and an outlet, the colloidal suspension flowing between the inlet and at least one outlet in a flow direction; and a gas permeable membrane separating the gas chamber and the flow chamber, the gas capable of permeating the membrane, the membrane being water impermeable, the gas permeating the membrane in a direction normal to the membrane so as to induce diffusiophoretic motion on at least some of the colloidal particles opposite to or in a direction normal to the membrane; the at least one outlet having a first outlet with water having a higher concentration of the colloidal particles than a second outlet. Other devices and methods are also provided.

17 Claims, 4 Drawing Sheets

Related U.S. Application Data

(60) Provisional application No. 62/587,510, filed on Nov. 17, 2017.

(51) Int. Cl.
*B01D 61/00* (2006.01)
*B01D 61/20* (2006.01)
*B01D 65/02* (2006.01)
*C02F 1/00* (2006.01)
*C02F 1/44* (2006.01)
*C02F 103/00* (2006.01)

(52) U.S. Cl.
CPC .............. *B01D 65/02* (2013.01); *C02F 1/004* (2013.01); *C02F 1/444* (2013.01); *B01D 61/20* (2013.01); *B01D 2321/26* (2013.01); *C02F 1/001* (2013.01); *C02F 2103/007* (2013.01); *C02F 2301/022* (2013.01)

(58) Field of Classification Search
CPC .... B01D 61/145; B01D 61/147; B01D 61/20; B01D 2321/18; B01D 2321/26; C02F 1/001; C02F 1/004; C02F 1/444; C02F 2103/007; C02F 2301/022; B01J 13/0039; G01N 33/0004; G01N 15/06; G01N 15/10; G01N 1/4055
See application file for complete search history.

(56) References Cited

OTHER PUBLICATIONS

"Membraneless water filtration using CO2" by Shin et al. (Nature Communications 8:15181), May 2, 2017.

"Diffusiophoresis at the macroscale" by Mauger et al. (arXiv: 1512.05005v4), Jul. 6, 2016.

"Origins of concentration gradients for diffusiophoresis" by Velegol et al, (10.1039/c6sm00052e), pp. 4686 to 4703, May 13, 2016.

* cited by examiner

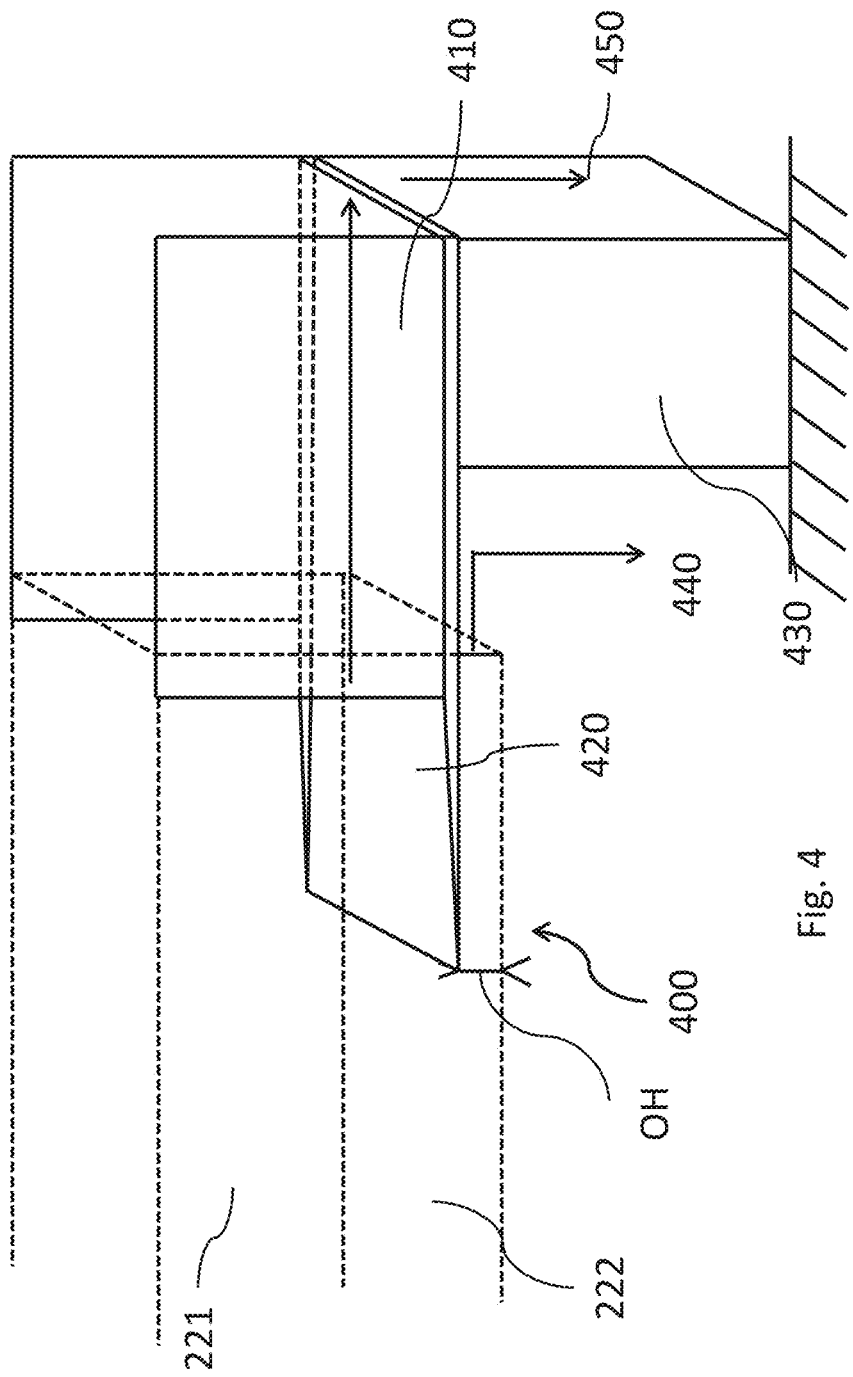

OPEN CHANNEL DIFFUSIOPHORETIC WATER FILTRATION DEVICE AND METHOD

This application claims the benefit of U.S. Provisional Patent Application 62/587,510, filed Nov. 17, 2017, the entirety of which is hereby incorporated by reference herein, and is also a continuation-in-part of U.S. patent application Ser. No. 15/861,273, filed Jan. 3, 2018, the entirety of which is hereby incorporated by reference herein. U.S. patent application Ser. No. 15/861,273, filed Jan. 3, 2018 also claims the benefit of U.S. Provisional Patent Application 62/587,510, filed Nov. 17, 2017.

This application relates generally to water filtration and more particularly to a diffusiophoretic water filtration device and method.

BACKGROUND

WO 2018/048735 discloses a device operative in separating particles in a flowing suspension of the particles in a liquid which device comprises: a first, pressurized cavity or plenum adapted to contain a gas, separated by a first gas permeable wall from a second cavity or plenum which contains a charged particle containing liquid which also contains an ion species formed by the dissolution of the gas within the liquid, which is in turn separated by a second permeable wall from the ambient atmosphere or an optional, third, relatively reduced pressure cavity or plenum which may contain a gas or a vacuum; wherein: the permeable walls operate to permit for the transfer of a gas from the first cavity through the second cavity and through the second permeable wall to the atmosphere or a third cavity and, the pressure present in atmosphere or the third cavity is lesser than that of the first cavity, thus forming an ion concentration differential within the liquid and between the permeable walls.

The related article "Membraneless water filtration using CO2" by Shin et al. (Nature Communications 8:15181), 2 May 2017, describes a continuous flow particle filtration device in a which a colloidal suspension flows through a straight channel in a gas permeable material made of polydimethylsiloxane (PDMS). A CO2 (carbon dioxide) gas channel passes parallel to the wall and dissolves into the flow stream. An air channel on the other side of the wall prevents saturation of CO2 in the suspension and the resulting gradient of CO2 causes particles to concentrate on sides of the channel, with negatively charged particles moving toward the air channel and positively charged particles toward the CO2 channel. The water away from the sides of the channel can be collected as filtered water.

The article "Diffusiophoresis at the macroscale" by Mauger et al. (arXiv: 1512.05005v4), 6 Jul. 2016, discloses that solute concentration gradients caused by salts such as LiCl impact colloidal transport at lengthscales ranging roughly from the centimeter down to the smallest scales resolved by the article. Colloids of a diameter of 200 nm were examined.

The article "Origins of concentration gradients for diffusiophoresis" by Velegol et al, (10.1039/c6sm00052e), 13 May 2016, describes diffusiophoresis possibly occurring in georeservoir extractions, physiological systems, drying operations, laboratory and industrial separations, crystallization operations, membrane processes, and many other situations, often without being recognized.

PCT Publication WO 2015/077674 discloses a process that places a microparticle including a salt in proximity to a membrane such that the microparticle creates a gradient generated spontaneous electric field or a gradient generated spontaneous chemiphoretic field in the solvent proximal to the membrane. This gradient actively draws charged particles, via diffusiophoresis, away from the membrane thereby removing charged particulate matter away from the membrane or preventing its deposition.

SUMMARY OF THE INVENTION

The present invention provides a water filtration device comprising:
  a pressurized gas chamber receiving a pressurized gas;
  an open flow chamber receiving a colloidal suspension including water and colloidal particles, the open flow chamber having an inlet and an outlet, the colloidal suspension flowing between the inlet and at least one outlet in a flow direction; and
  a gas permeable membrane separating the gas chamber and the flow chamber, the gas capable of permeating the membrane, the membrane being water impermeable, the gas capable of permeating the membrane in a direction normal to the membrane so as to induce diffusiophoretic motion on at least some of the colloidal particles opposite to or in the direction normal to the membrane;
  the at least one outlet having a first outlet with water having a higher concentration of the colloidal particles than a second outlet.

The present invention overcomes one or more of the deficiencies of the continuous flow particle filtration device described by the WO 2018/048735 A1 publication and the article "Membraneless water filtration using CO2" cited above, including but not limited to: (1) Energy consumption caused by pressure drops across the closed channel created by the two opposing wall structure, even if this energy consumption is lower than for conventional membrane-based microfiltration and ultrafiltration devices; (2) Fouling and difficulty of cleaning the two walled geometry; and (3) Complicated and expensive construction prone to defects caused by the creation of a two walled structure for example using microfabrication techniques on PDMS material.

The present invention advantageously uses an open channel rather than the closed, two walled, channel structure of the WO 2018/048735 A1 publication.

The gas permeable membrane may be a sheet, preferably made from PDMS, and may be for example a PDMS membrane. One preferred such sheet is a PDMS silicone membrane available from Specialty Silicone Products, Inc. of Ballston Spa, N.Y.

A preferred thickness of the sheet may be from 0.001 cm to 0.025 cm, and most preferably from 0.002 cm to 0.01 cm to permit good CO2 diffusion.

The sheet preferably is at least 1 m wide by 10 m long, although much larger widths and lengths are preferred, preferably at least 5 m wide by 50 m long. Smaller sheets however are possible.

The sheet preferably is unstructured, although open structuring such as ribbing or channel in the length direction is possible.

The sheet preferably has a Shore A of between 40 and 60, and a tensile elongation of at least 1000 psi. The elongation to failure is preferably at least 200%, and most preferably at least 400%, and the tear B is at least 150 ppi.

All of the sheet values, including thickness, are advantageous during manufacture of the present device, as the sheet can be stretched taut for example to provide an excellent flow surface.

The pressurized gas preferably can be $CO_2$, preferably pressurized to at least 120 kPa and most preferably to at least 130 kPa, preferably between 130 kPa and 150 kPa.

The flow chamber advantageously is an open flow chamber, so that the colloidal suspension may be in direct contact with the atmosphere. A plane of the sheet can extend horizontally, with a slight downward slope from the inlet to the outlet so as to define a horizontal water filtration device. A slope of the sheet is preferably greater than 1 mm per meter, to aid in manufacturing of a large scale device, which may for example be 50 meters long. A covering, spaced apart from the channel for example as a tent, for the open flow chamber may be provided to aid in preventing contamination, for example from pollen or birds. There thus is no pressure drop as through a closed channel, and energy consumption is reduced. Gravity thus drives the flow due to the sloped structure.

The at least one outlet advantageously can include a movable splitter for altering the size of the first outlet. For example, the first outlet may be located next to the sheet, and the splitter may be spaced from the sheet, and movable to alter a distance between the splitter and the sheet, so that a size of the first outlet is altered. Preferably, as the first outlet increases in size the second outlet decreases in size and visa versa. The outlet also may be a removable device, so that for example different splitter sizes can be provided via a fixed splitter distance. For example, one outlet can have a splitter spaced at 1 mm above the bottom of the membrane for a certain type of colloidal suspension, and then replaced with an outlet located at 500 micrometers for a second type of colloidal suspension. An outlet with three outlet streams and two splitters also is possible, with both or one splitter being movable, or the outlet being replaceable to alter the splitter spacing.

The first outlet size thus may be altered as a function of the colloidal particles in the water exiting through the at least one outlet, for example an efficiency of the filtration. For example, if the amount of certain colloidal particles in the water in the second outlet exceed a certain threshold, the first outlet size can be increased, for example via a controller altering the splitter distances.

The present invention is more suitable to large scale installations, since the dwell time needed for the novel open flow channel diffusiophoretic filtration device is quite large.

In a preferred embodiment, a slope of the membrane is at least 0.001 m/m, a width is at least 5 m, a depth of the open flow channel at least 1 mm, and the length of the membrane at least 10 m, and preferably at least 50 m. These dimensions can aid in providing laminar and subcritical flow, permit manufacturing without difficult tolerances, and provide good flow rates.

The slope and the skew can be altered, for example with individual motors located on each leg of a support structure for the membrane and $CO_2$ chamber, and controlled via the controller.

The present invention thus also provides a water filtration device comprising:
  a flow chamber receiving a colloidal suspension including water and colloidal particles, the flow chamber having an inlet and an outlet, the colloidal suspension flowing between the inlet and at least one outlet in a flow direction; and
  a gas permeable membrane separating the gas chamber and the flow chamber, the gas permeating the gas permeable material so as to induce diffusiophoretic motion on at least some of the colloidal particles;
  the at least one outlet having a first outlet with water having a higher concentration of the colloidal particles than a second outlet,
  the gas permeable membrane having a slope of at least 0.001 m/m.

The present invention also provides a method for operating a water filtration device comprising:
  flowing a colloidal suspension including water and colloidal particles over a gas permeable membrane in an open channel state; and
  providing a gas to permeate the permeable membrane and contact the colloidal suspension in the open channel state so as to induce diffusiophoretic motion on at least some of the colloidal particles.

The flow in the open channel state preferably is laminar, most preferably with a Reynolds number less that 2000, and even more preferably less than 200, and subcritical to aid in the diffusiophoretic motion perpendicular to the membrane.

The flow velocity is preferably at least 0.05 meters per second, and the flow depth at least 1 mm to provide good flow rates.

The present invention also provides a water filtration device comprising an inlet manifold and a diffusiophoretic water filter, the inlet manifold providing a constant pressure across a width to an inlet of the diffusiophoretic water filter.

In one embodiment the inlet manifold includes an overflow structure, for example a broad-crested weir structure.

The present invention also provides a water filtration device comprising a diffusiophoretic water filter with a removable outlet, the outlet being exchangeable with a further having a different water outlet size.

The present invention also provides a water filtration device comprising a diffusiophoretic water filter having an alterable slope, and a method for altering a slope of a diffusiophoretic water filter.

BRIEF DESCRIPTION OF THE DRAWINGS

One schematic embodiment of the water filtration system of the present invention is shown by reference to:

FIG. 4 shows schematically an alternate embodiment of an outlet of the present invention.

DETAILED DESCRIPTION OF AN EMBODIMENT

Figure 1:
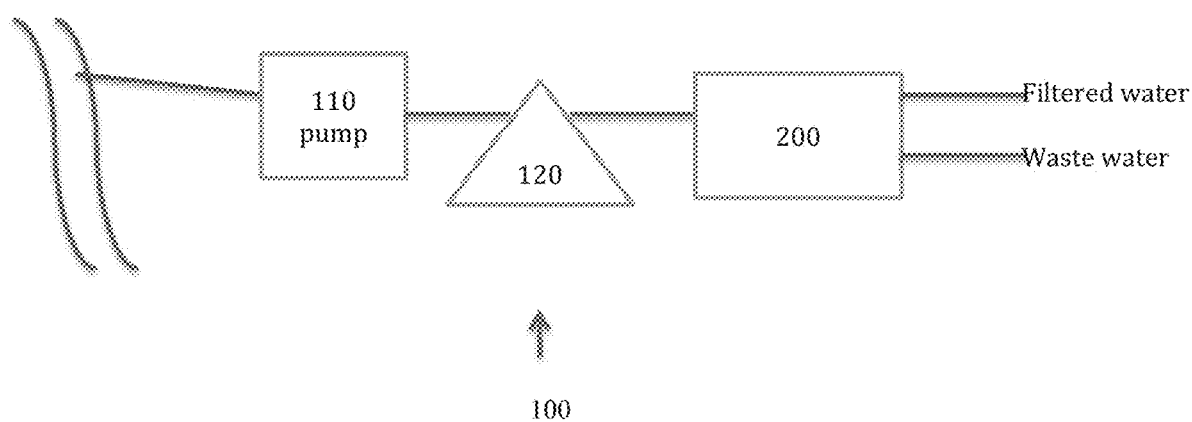
FIG. 1, which shows a schematic view of the system.

FIG. 1 shows a water filtration system 100 for cleaning river water, which may contain various colloidal particles such as plastic or PFA particles, and other bioparticles such as bacteria, viruses and which are defined herein as colloidal particles when in suspension with water (the term colloid used in the provisional application incorporated herein thus being properly termed colloidal particle). Many of these colloidal particles are charged negatively or positively. Any type of water with charged colloidal particles may be filtered using the present invention, including seawater.

Water filtration system 100 includes a pump 110 pumping water from a river. The pump 110 pumps the water through a sand filter 120 to remove larger particles and impurities. The water with colloidal particles remaining then passes to the water filtration device 200 of the present invention.

Water filtration device 200 is designed to remove positively charged colloids, the removal of which can significantly increase the water quality.

Figure 2:
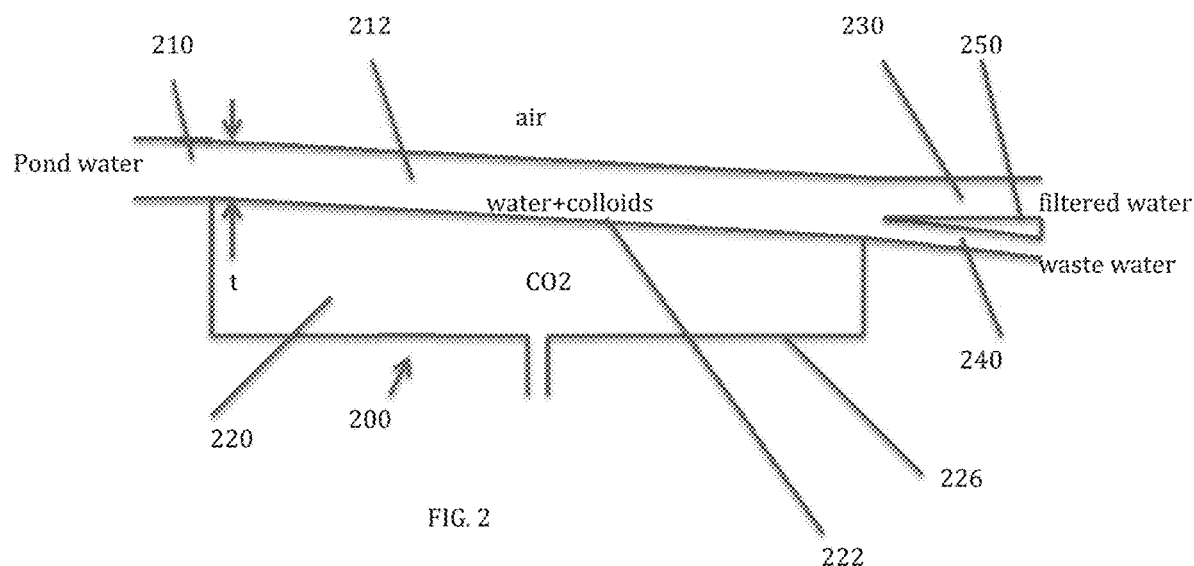
FIG. 2; which shows an embodiment of the water filtration device of the present invention schematically.

Water filtration device 200, shown in FIG. 2 schematically, has an inlet 210 receiving pond water with colloidal particles, preferably having passed through a preliminary filter or sedimentation device, such as sand filter 120. However, water filtration device 200 could be upstream of sand filter 120, thereby removing bacteria and other particles that can foul the sand filter 120. Separate water filtration devices 200 could also be both upstream and downstream of sand filter 120.

An inlet manifold 300 spreads the water with colloidal particles in the widthwise direction (into the page in FIG. 2) from a pipe received from sand filter 120 and allows inlet 210 an even pressure of water across the width of the inlet 210. In a preferred example, the water with colloidal particles is spread to a width of 10 m, and has a thickness of 4 mm, and flows at a speed of 0.105 m/s as it exits inlet manifold 300. The flow rate of the pond water to be filtered thus is 0.0042 cubic meter per second or 252 liters per hour. The water with colloids thus runs at 4 mm thickness over a sheet 222 at the bottom a flow chamber 212, in this example an SSP-M823 silicone membrane of 0.005 inches thickness made of PDMS from Specialty Silicone Products, Inc. If the Manning's roughness coefficient n value of the silicone can be estimated as about 0.012, and the colloidal suspension runs at a slope of 0.25 cm/m, a Reynolds number of approximately 1680 (estimated for open channel flow as 4*hydraulic radius*v/kinematic viscosity) and a Froude number of about 0.53 results. Laminar and subcritical flow thus can result. The Reynolds number preferably is 2300 or less and most preferable 2000 or less, and the Froude number less than 1.0.

Figure 3:
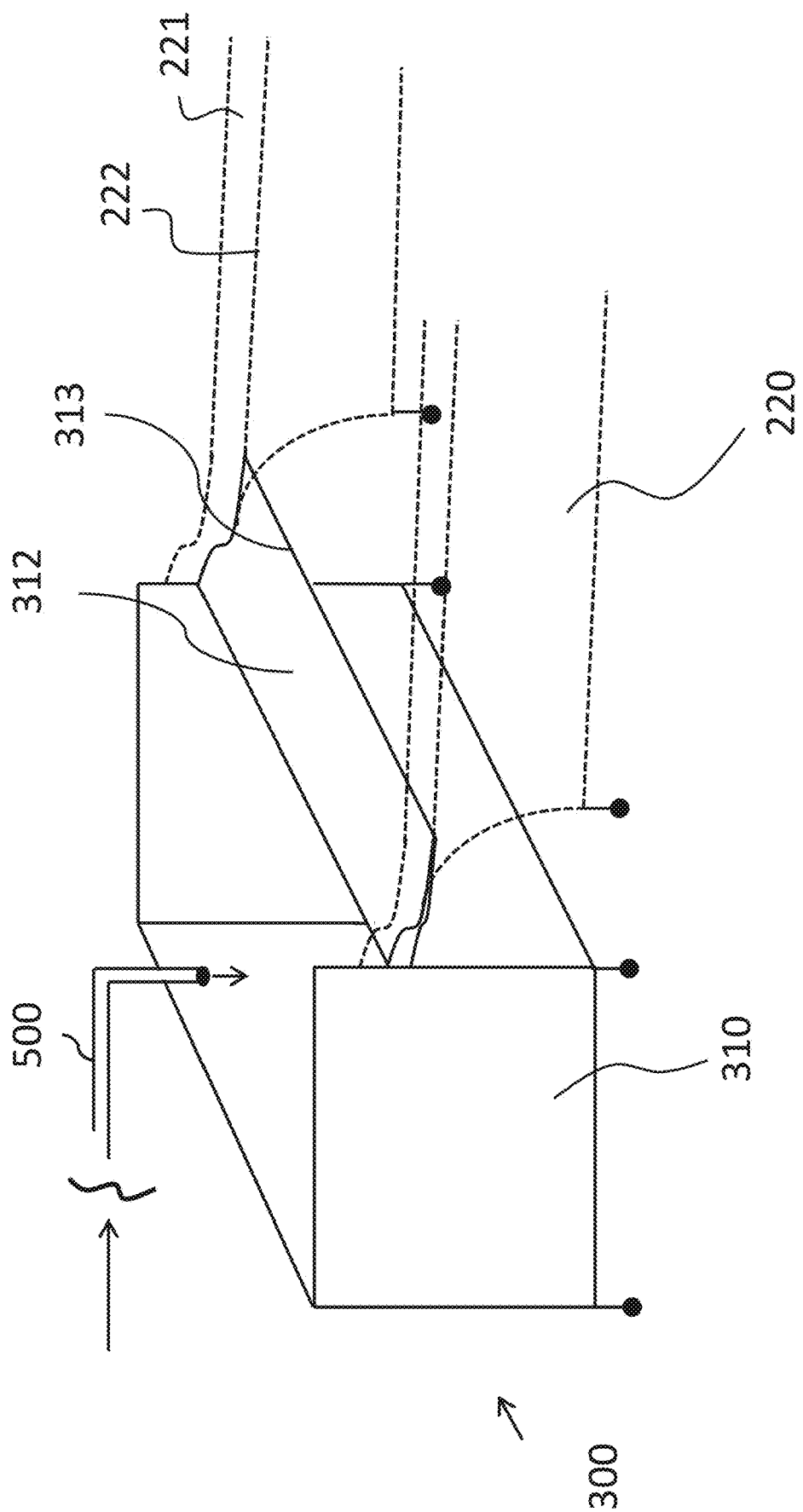
FIG. 3 shows schematically an embodiment of a one inlet manifold according to the present invention.

FIG. 3 shows one embodiment of inlet manifold 300 using a broad-crested weir construction. Water from pipe 500 flows into a container 310 at a rate for example of 0.0042 cubic meters per second, and exits at a sloped weir 312 with an edge 313 that can sit on membrane or sheet 222. At 10 meters width, the water with colloids exits at approximately an even height of 4 mm. The height flowing over weir 312 can be altered by altering the flow rate according to the formula, $Q=CLH^{3/2}$, where C is the discharge coefficient 1.704 $m^{1/2}/s$. As with the filtration device 200, each of the legs of the inlet manifold 310 may have individual motors controllable by a controller to alter the slope and/or skew of the inlet manifold 310, for example to ensure an even height flow over the weir. The container preferably is large enough to ensure no ripple or other effects from the pipe and may be for example preferably at least 1 cubic meter and more preferably 10 cubic meters in size, and may also aid in settling non-colloidal particles in the water.

Depending on the type of gas used and other variables such as the colloidal particles present, the diffusiophoretic velocity of the colloidal particles toward the membrane (for positive particles) will vary. However, a velocity of 5 micrometers per second is possible for many if not most particles sought to be removed. It should be noted that negatively charged particles will move away from the membrane and may be skimmed off the top, although such a procedure is only necessary if removal of such particles is desired. Moreover, removal solely of negatively charged particles is also possible.

For a given thickness of 4 mm and a velocity of 5 micrometers per second, to move even the topmost colloidal particles at the inlet to the membrane at the outlet, a dwell time of 800 seconds can be used. Given a flow rate of 0.105 m/s, a flow channel of 84 meters long is provided. With a slope of 0.0025 m/m, the water with colloids thus can begin at a height of 0.21 meters at the inlet above the outlet. The present preferred embodiment thus requires rather precise engineering to slope the membrane to drop 21 centimeters over 84 meters. However with laser aided grading and positioning, and the use of for example a steel support structure with controllable positioning motor on each leg at the four corners for example, the required slope can be rather easily accomplished, and can be little impacted by temperature or other changes.

The actual diffusiophoretic velocity of the colloidal particles can vary, and should particles sought to be removed move more slowly, the suspension thickness can be decreased to increase the gas gradient, or the device lengthened for example, or the output splitting adjusted to remove less filtered water. The width can be increased to increase throughput.

A pressurized gas chamber 220 receives a pressurized gas, such as carbon dioxide, from for example an industrial source. Gas chamber 220 has gas tight walls 226, over which sheet 222 can be stretched taut and fastened to in a gas tight manner, for example with fasteners and a sealant. The pressurized gas thus can exit in a uniform manner through the sheet 222. Sheet 222 thus defines the top of gas chamber 220 and the bottom of flow chamber 212.

The colloidal suspension flows from inlet 210 through flow chamber 212, which can have water tight walls (221, FIG. 3) extending from and sealed with respect to sheet 222. The colloidal suspension thus flows between inlet 210 and two outlets 230, 240 in a flow direction, the sheet 222 capable of being sloped as described above.

$CO_2$ gas permeates the sheet or membrane 220 in a direction normal to the sheet or membrane 220 so as to induce diffusiophoretic motion on positively charged colloidal particles opposite to the direction normal to the membrane, here toward the sheet 220. Negatively charged colloids can move away from the sheet 220, and possibly be filtered, split or suctioned from the top of the suspension. The removal of both negatively and positively charged colloids is optional and not necessary in the single splitter embodiment, which can filter one of either the negative or positive charged particles.

Outlet 240 thus has water having a higher concentration of positively charged colloidal particles, defined as waste water although it can be re-used or refiltered, than a second outlet 230, which can be defined as having filtered water. Alternately, if seeking to remove negatively charged particles, outlet 230 can have a larger concentration of negatively charged particles and outlet 240 can be defined as being filtered water. Two devices can also be used in series to remove both positive and negatively charged particles.

A splitter 250, extending widthwise in a wing-shaped manner with a trailing edge of the wing facing the stream, is moveable upwardly or downwardly in this embodiment, and can alter the dimensions of the outlet 240, and thus outlet 230. This adjustment can be a function of the water quality of the filtered water for example, and provides highly advantageous control of water quality, for example as the sources to be filtered are impacted, for example by rainwater.

The splitter 250 may be keyed for example for rotation about a shaft, the shaft at one end having a worm gear movable for example by a worm driven by a motor and controller. Very fine distance gradations thus can be achieved. In the example show, the splitter can be located at 1 mm above the sheet 222 and a bottom of the outlet 240, so that 3 mm of the 4 mm thick stream passes above the splitter. The distance however can be adjusted as a function of the colloid distribution in the thickness direction in the stream. The splitter 250 can be for example made of steel with a tip machined to be less than 20 micrometers in thickness at the tip, but can become wider to provide sufficient strength on the width direction.

The flow rate, flow speed and other variables such as size can be selected to minimize mixing, which can aid colloidal particle movement. The cross section of flow chamber 212 in the widthwise direction preferably is at least 1 m in the widthwise direction, and has a height of at least 1 mm, and forms a rectangular shape. A mixing reducer, such as fins extending in the flow direction to prevent widthwise movement, can be placed directly on sheet 222. This can also aid in reducing bulging on the sheet 222 from the gas pressure.

FIG. 4 shows schematically an alternate removable outlet device 400. A splitter 420 may be connected to outlet walls 410 on a support 430. Splitter 420 protrudes to fit between walls 221 of the flow channel at a height OH above membrane 222. Walls 410 are liquid tight with walls 221 and water closer to membrane 222 can exit out of outlet 440 and water further away from membrane 222 at outlet 450. An alternate removable outlet device with a different height OH then can be used in place of device 400 to alter the splitter height, for example for different type of colloidal suspension to be filtered.

The present device allows for a simply-constructed, large flow rate water filtration device that can be generally free of fouling and easy to clean and maintain, all with a low energy consumption. The open channel nature of the present invention permits for large scale water filtration devices that dispense with the need for microchannels or second membranes for closed flow. While the use of open-channel flow for diffusiophoretic water filtration has certain disadvantages over closed-channel constructions in terms of creating and maintaining laminar flows, it is believed that open-channel flows and devices provide an important advancement in the field of diffusiophoretic water filtration and provide for less energy, easier cleaning and better flow rates, especially for large scale structures with flow lengths of 10 meters or more.

What is claimed is:

1. A water filtration device comprising:
   a pressurized gas chamber receiving a pressurized gas;
   an open flow chamber receiving a colloidal suspension including water and colloidal particles, the open flow chamber having an inlet and at least one outlet, the colloidal suspension flowing between the inlet and the at least one outlet in a flow direction; and
   a gas permeable membrane separating the gas chamber and the flow chamber, the gas capable of permeating the membrane, the membrane being water impermeable, the gas permeating the membrane in a direction normal to the membrane so as to induce diffusiophoretic motion on at least some of the colloidal particles opposite to or in a direction normal to the membrane;
   the at least one outlet having a first outlet with water having a higher concentration of the colloidal particles than a second outlet; wherein the open flow chamber is open to the atmosphere along a length.

2. The water filtration device as recited in claim 1 wherein the gas permeable membrane has hag a slope of at least 0.001 m/m.

3. The water filtration device as recited in claim 2 wherein the colloidal suspension is water to be filtered and the second outlet provides drinking water.

4. The water filtration device as recited in claim 1 wherein the colloidal suspension is water to be filtered and the second outlet provides drinking water.

5. The water filtration device as recited in claim 2 further comprising a membrane support and wherein the membrane is stretched taut over the support.

6. The water filtration device as recited in claim 1 further comprising a membrane support and wherein the membrane is stretched taut over the support.

7. The water filtration device as recited in claim 2 wherein the membrane is at least 1 m wide by 10 m long.

8. The water filtration device as recited in claim 1 wherein the membrane is at least 1 m wide by 10 m long.

9. A method for operating the water filtration device as recited in claim 2 comprising passing water to be filtered as the colloidal suspension through the water filtration device.

10. A method for operating the water filtration device as recited in claim 1 comprising passing water to be filtered as the colloidal suspension through the water filtration device.

11. The water filtration device as recited in claim 1 wherein an entirety of the open flow chamber is subject to atmospheric pressure.

12. The water filtration device as recited in claim 1 further comprising an inlet manifold, the inlet manifold being a weir.

13. The water filtration device as recited in claim 12 further comprising a sand filter upstream of the weir.

14. The water filtration device as recited in claim 1 further comprising a support structure supporting the membrane, the membrane being at least 1 m wide and 10 m long.

15. A method for operating the water filtration device as recited in claim 14 comprising passing water to be filtered as the colloidal suspension through the water filtration device.

16. A method for operating a water filtration device including: a pressurized gas chamber receiving a pressurized gas; an open flow chamber receiving a colloidal suspension including water and colloidal particles, the open flow chamber having an inlet and at least one outlet, the colloidal suspension flowing between the inlet and the at least one outlet in a flow direction; and a gas permeable membrane separating the gas chamber and the flow chamber, the gas capable of permeating the membrane, the membrane being water impermeable, the gas permeating the membrane in a direction normal to the membrane so as to induce diffusiophoretic motion on at least some of the colloidal particles opposite to or in a direction normal to the membrane; the at least one outlet having a first outlet with water having a higher concentration of the colloidal particles than a second outlet, the method comprising:
   flowing the colloidal suspension particles over the gas permeable membrane while exposed to atmospheric pressure on a side opposite the gas permeable membrane.

17. The method as recited in claim 16 wherein the water filtration device further includes comprising an inlet manifold, the inlet manifold being a weir.

\* \* \* \* \*